United States Patent [19]
DeRees et al.

[11] Patent Number: 5,671,964
[45] Date of Patent: Sep. 30, 1997

[54] VEHICLE SEAT MOUNTING MECHANISM

[75] Inventors: Delbert D. DeRees, Romeo; Kanaiyalal C. Mehta, Rochester Hills; Robert A. Vetter, Sterling Heights; Howard W. Meyer, Bloomfield Hills, all of Mich.

[73] Assignee: Chrysler Corporation, Auburn Hills, Mich.

[21] Appl. No.: 559,897

[22] Filed: Nov. 17, 1995

Related U.S. Application Data

[63] Continuation-in-part of Ser. No. 174,088, Dec. 28, 1993, abandoned.

[51] Int. Cl.$^6$ .................................................. B60N 1/02
[52] U.S. Cl. ............................ 296/65.1; 297/344.12; 297/344.15; 248/566; 248/567
[58] Field of Search .................... 296/65.1; 297/344.1, 297/344.12, 344.15; 248/562, 564, 566, 567

[56] References Cited

U.S. PATENT DOCUMENTS

| | | | |
|---|---|---|---|
| 4,148,518 | 4/1979 | Vilbeuf | 296/65 R |
| 4,626,018 | 12/1986 | Massey | 296/65.1 |
| 4,793,583 | 12/1988 | Bergacker et al. | 296/65.1 X |
| 4,822,094 | 4/1989 | Oldfather et al. | 296/65.1 |
| 4,913,482 | 4/1990 | Hanai et al. | 296/65.1 |
| 4,941,641 | 7/1990 | Granzow et al. | 248/588 |
| 5,176,355 | 1/1993 | Carter | 296/65.1 X |
| 5,222,709 | 6/1993 | Culley, Jr. et al. | 248/421 |
| 5,234,203 | 8/1993 | Smith | 267/131 |

*Primary Examiner*—Joseph D. Pape
*Attorney, Agent, or Firm*—Thomas G. Pasternak

[57] ABSTRACT

A vehicle seat mounting mechanism including oppositely disposed pairs of parallel links between a base and a seat carrier, and a first air bag spring operatively connected between the base and the links for absorbing vertical-upward motion induced by road shocks, and a second air bag spring secured between the base and the seat carrier for absorbing vertical-downward motion induced by road shocks. A separate shock absorber mounted between the base and the seat carrier serves to dampen the springing action of the first and second air bag springs.

13 Claims, 5 Drawing Sheets

VEHICLE SEAT MOUNTING MECHANISM

This is a continuation-in-part application of Ser. No. 08/174,088, filed Dec. 28, 1993, now abandoned.

TECHNICAL FIELD

This invention relates generally to seat mounting mechanisms in vehicles and, more particularly, to such mechanisms which include suspension units associated therewith.

BACKGROUND ART

Heretofore, various seat mounting and suspension systems have been used. It is known to employ scissor-like linkage and cam track assemblies providing a vertical range of seat cushion travel. Examples are Vilbeuf U.S. Pat. No. 4,148,518, Oldfather et al U.S. Pat. No. 4,822,094, Hanai et al U.S. Pat. No. 4,913,482, Granzow et al U.S. Pat. No. 4,941,641, and Culley, Jr. et al U.S. Pat. No. 5,222,709.

In addition to using a scissor-like linkage arrangement:
A. Vilbeuf U.S. Pat. No. 4,148,518 includes a hydropneumatic device associated with an automatic monitoring distributor adapted to be connected to the pressure fluid circuit of the vehicle and capable of regulating the fluid pressure in the hydropneumatic device as a function of the seat squab frame oscillation.
B. Oldfather et al U.S. Pat. No. 4,822,094 includes a damper assembly for regulating the seat cushion travel.
C. Hanai et al U.S. Pat. No. 4,913,482 includes a sensor which detects the condition of the road surface to produce relatively hard suspension characteristics when the vehicle is running on a rough road and softer characteristics when traversing a smooth surface road.
D. Culley, Jr. et al U.S. Pat. No. 5,222,709 discloses a bellows assembly including a bladder having a perforated valve in the upper end thereof and an internal spring, serving to provide a damping or travel control effect when the vehicle encounters a hole.
E. Granzow et al U.S. Pat. No. 4,941,641 includes an air spring, a locking device for adjustably fixing the vertical height of the seat, and a non-return valve for controlling the admission of compressed air into and the escape of compressed air from the air spring.
F. Smith U.S. Pat. No. 5,234,203 includes a single pneumatic spring for damping the relative motion between a vehicle seat and a base, and means for providing the spring with desirable rate characteristics when exposed to either low frequency input or high frequency input.

DISCLOSURE OF THE INVENTION

A general object of the invention is to provide an improved vehicle seat mounting mechanism.

Another object of the invention is to provide a vehicle seat mounting mechanism with improved means associated therewith for initially adjusting the seat and for absorbing road shocks during travel.

A further object of the invention is to provide a vehicle seat mounting mechanism including oppositely disposed pairs of parallel links between a base and a seat carrier, a first air bag spring for absorbing vertical-upward motion induced by road shocks, and a second air bag spring for absorbing vertical-downward motion induced by road shocks.

A still further object of the invention is to provide a vehicle seat mounting mechanism including oppositely disposed link means between a base and a seat carrier, a first air bag spring operatively connected between the base and the link means, and a second air bag spring secured between the base and the seat carrier.

These and other objects and advantages will become more apparent when reference is made to the following drawings and the accompanying description.

BEST MODE OF CARRYING OUT THE INVENTION

Figure 1:
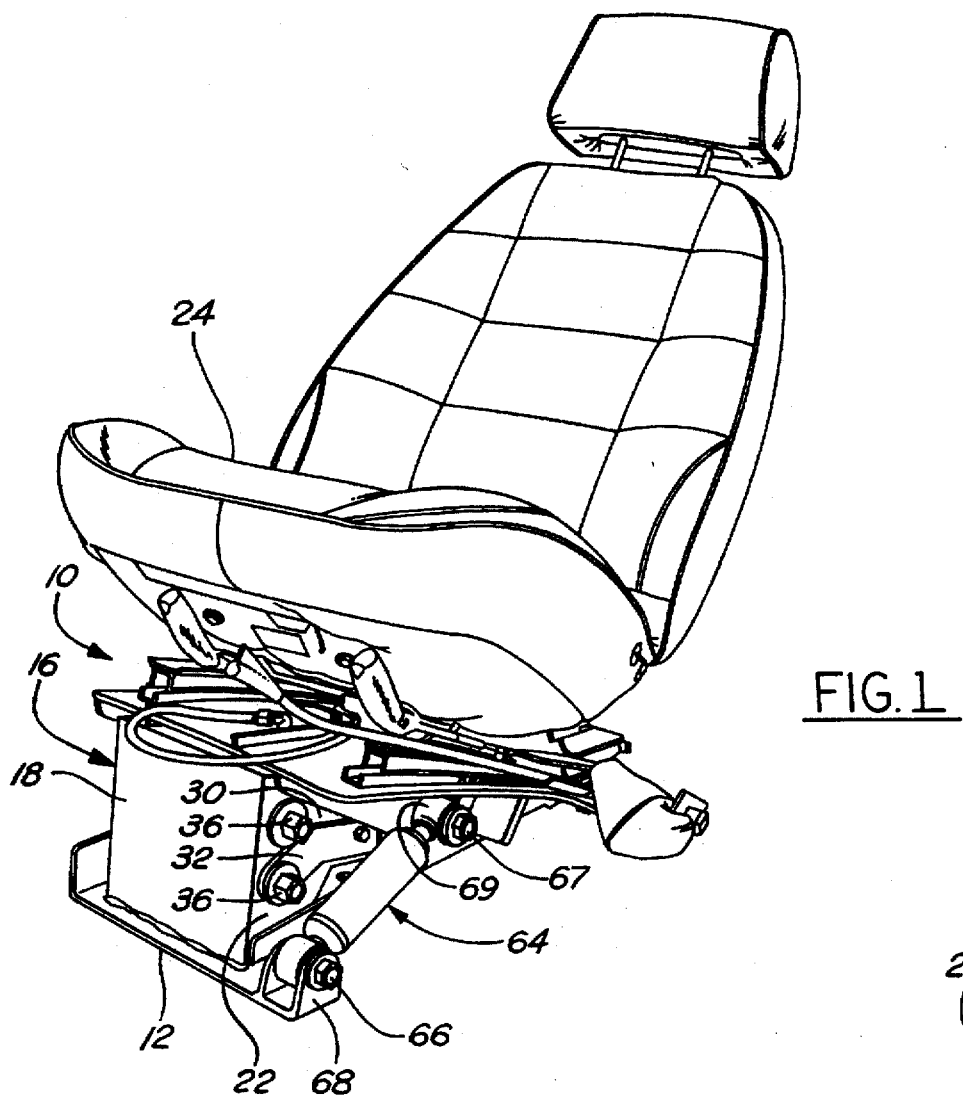
FIG. 1 is a perspective view of a vehicle seat embodying the invention.
Figure 3:
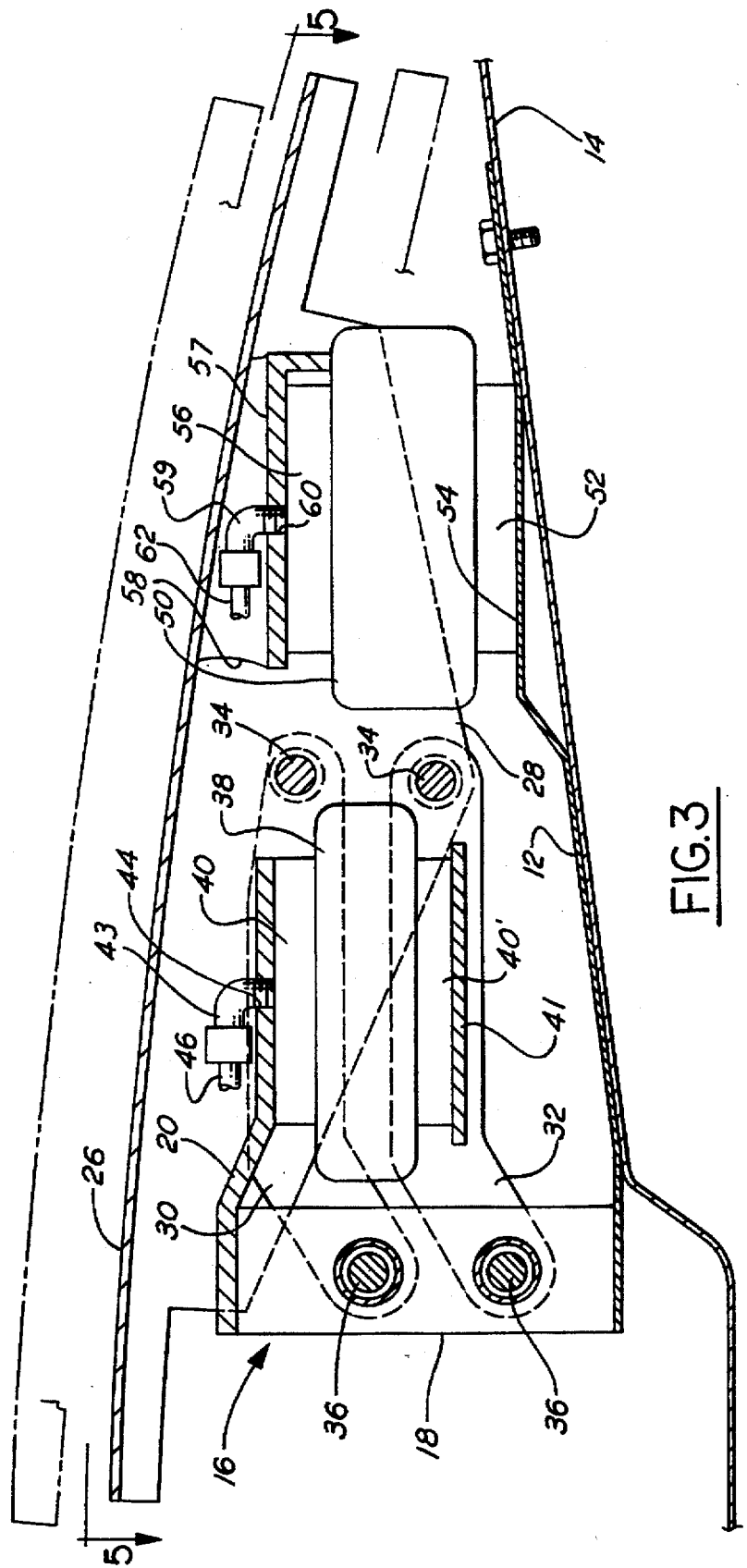
FIG. 3 is a side elevational view of a vehicle seat mounting mechanism embodying the invention.
Figure 5:
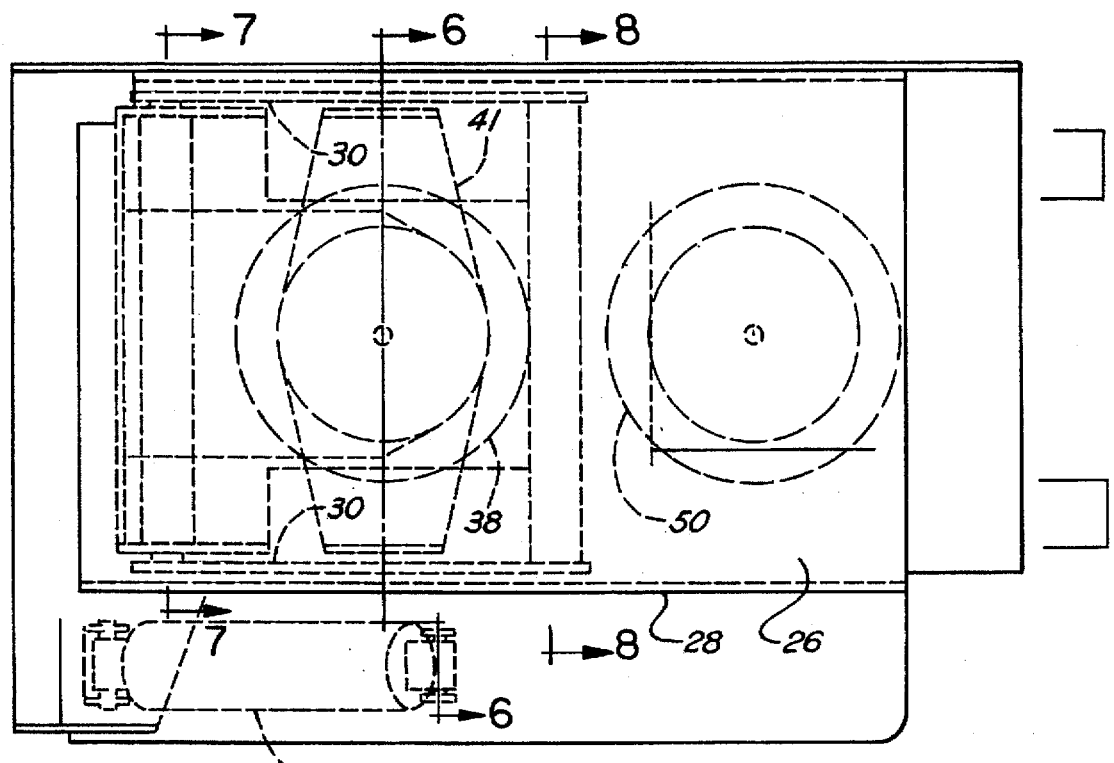
FIG. 5 is a top view taken along the plane of the line 5—5 of FIG. 3, and looking the direction of the arrows.
Figure 4:
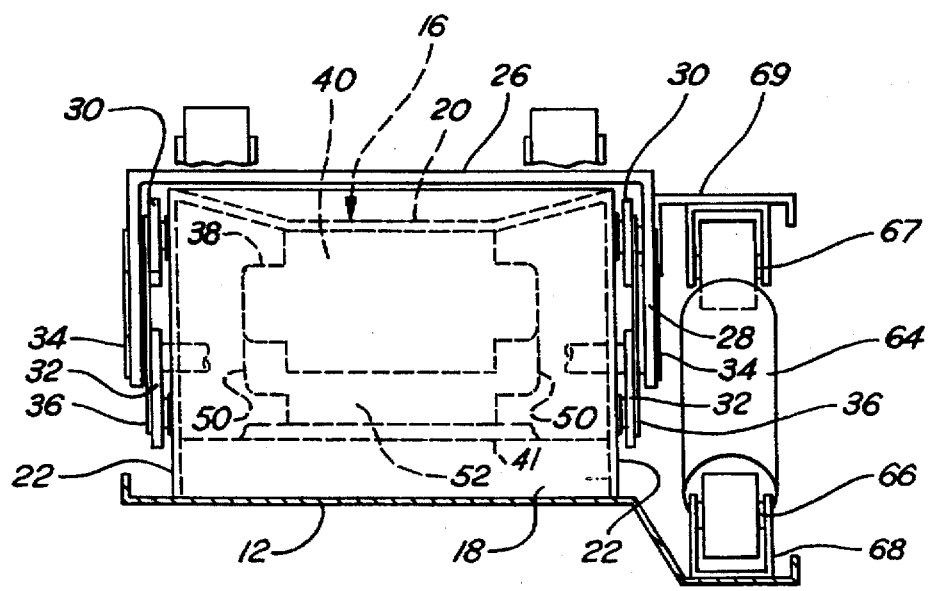
FIG. 4 is an end view taken from the front of the seat mounting mechanism.

Referring now to the drawings in greater detail, FIG. 1 illustrates a vehicle seat mounting arrangement 10 including a base 12 secured on a vehicle floor pan 14 (FIG. 3). A tower 16 includes a front wall 18 integrally connected at its lower edge to the base 12, a top wall 20 integrally connected at its forward edge to the upper edge of the front wall, and oppositely disposed side walls 22 integrally connected to the front and top walls 18 and 20, respectively.

A vehicle seat 24 is secured on a seat carrier 26. Carrier flanges 28 extend downwardly from oppositely disposed sides of the seat carrier 26.

Figure 7:
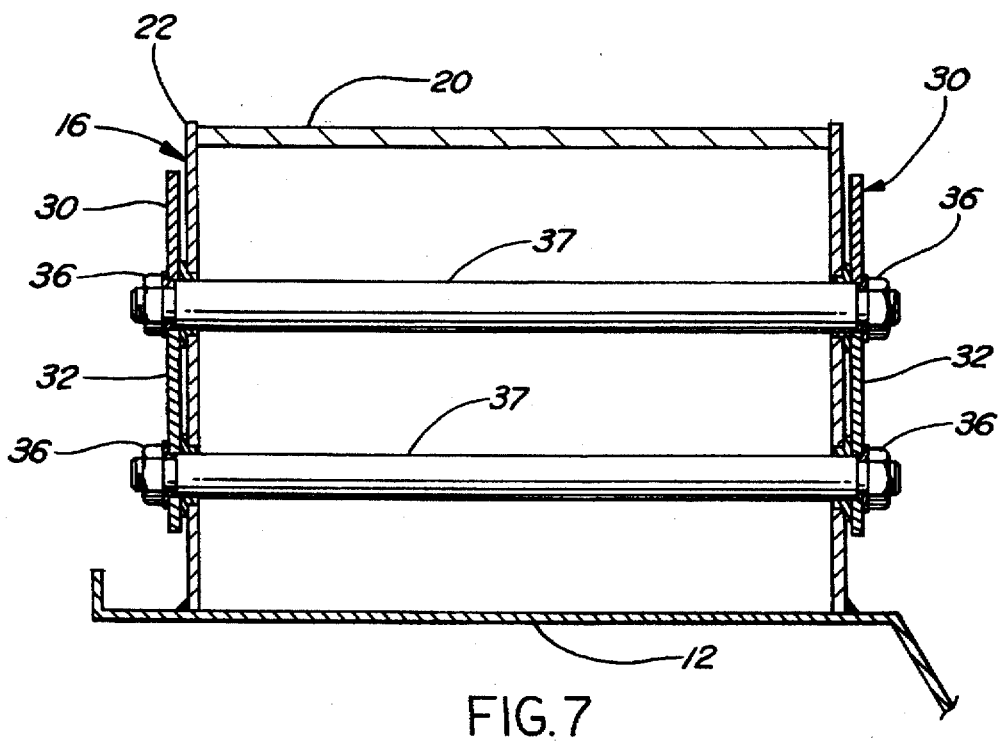
Figure 8:
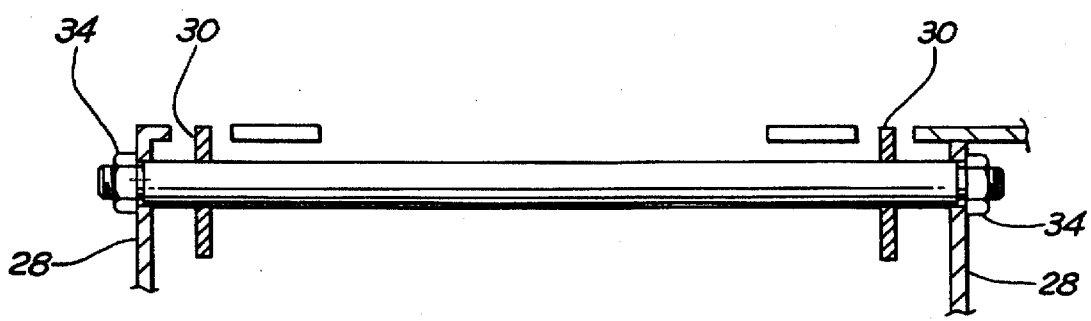

A pair of parallel links 30 and 32 are pivotally mounted at the respective ends thereof by respective rear and forward pivot connections 34 and 36 to each flange 28 (FIG. 3) and side wall 22. The oppositely disposed forward pivot connections 36 are interconnected by rods 37 (FIG. 7) extending therebetween intermediate the seat carrier 26 (FIG. 3) and the base 12.

Figure 6:
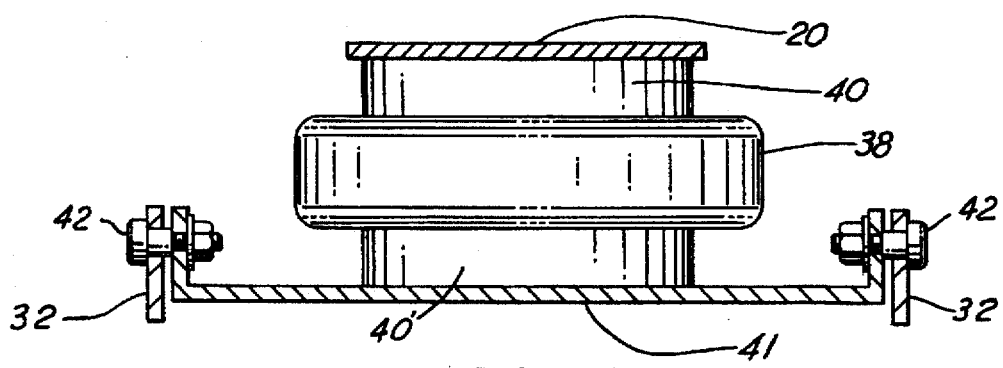
FIGS. 6, 7 and 8 are cross-sectional views taken along the planes of the respective lines 6—6, 7—7, and 8—8 of FIG. 5, and looking in the directions of the arrows.

As shown in FIG. 3, a front air bag spring 38 is secured at an upper segment 40 thereof to the top wall 20 and at a bottom segment 40' thereof to a bottom tray 41 spaced apart from the base 12. As shown in FIG. 6, the bottom tray 41 is secured by suitable fasteners 42 for movement with the lower links 32. A fitting 43 (FIG. 3) is mounted through an opening 44 formed in the top wall 20 and secured to the air bag spring 38 for communication with the inner volume thereof. An air line 46 is connected between the fitting 43 and a control unit 48 (FIG. 10) including a suitable compressor unit outfitted with pressure regulators, as will be explained.

As further shown in FIG. 3, a rear air bag spring 50 is secured in any convenient manner at its bottom segment 52 to a raised portion 54 of the base 12 and at its upper segment 56 to a wall 57 secured to a lowered portion 58 of the seat carrier 26. A fitting 59 is mounted through an opening 60 formed in the wall 57 and secured to the air bag spring 50 for communication with the inner volume thereof. An air line 62 is connected between the fitting 59 and the control unit 48 (FIG. 10).

Figure 10:
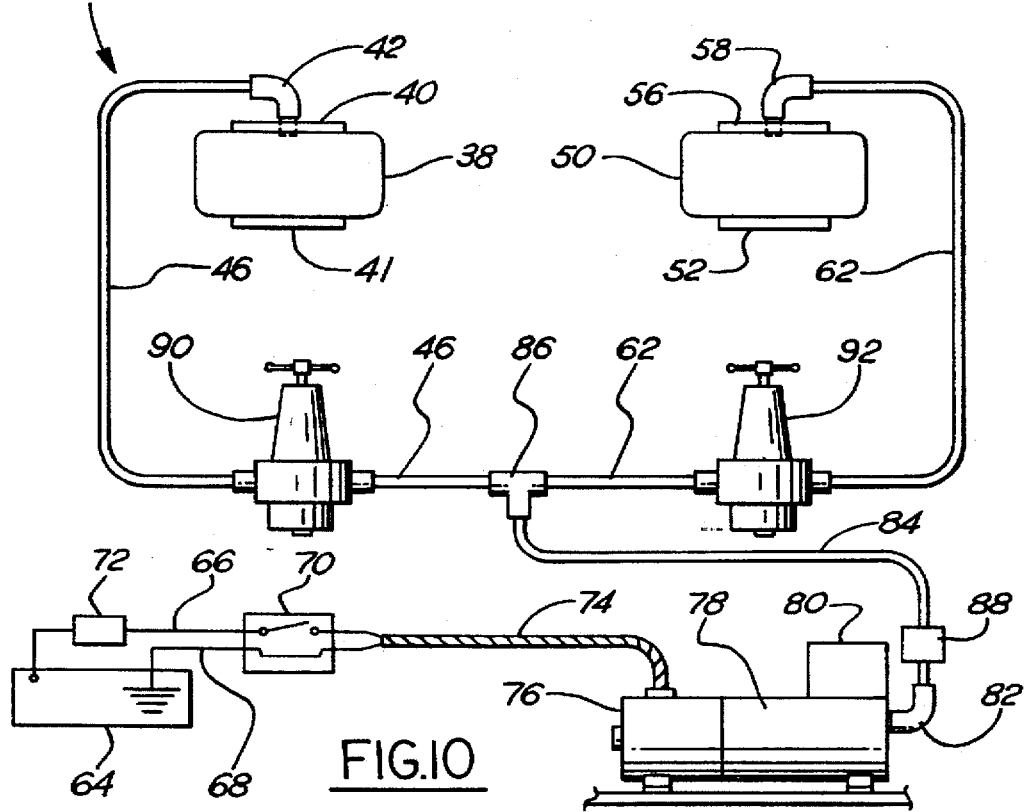
FIG. 10 is a perspective view of the actuating portions of the FIG. 9 layout as related to the vehicle seat.

Referring now to FIG. 10, the control system 48 is shown connected from the vehicle battery 64 via lead lines 66 and 68. The lead line 66 is operatively connected to an on-off switch 70. A circuit breaker 72 is mounted in the line 66. The lines 66 and 68 extend beyond the switch 70 through a conduit 74 to an electric motor 76 operatively connected to an air compressor 78. Air enters the latter through an inlet 80, and exits through an outlet 82 at a predetermined high line pressure, and thence through a hose 84 to a tee fitting 86. A check valve 88 is mounted in the hose 84.

The previously mentioned air lines 46 and 62 communicate between the tee fitting 86 and the respective fittings 42 and 58 of the front and rear air bag springs 38 and 50. Adjustable pressure regulators 90 and 92 are mounted in the respective lines 46 and 62.

Figure 9:
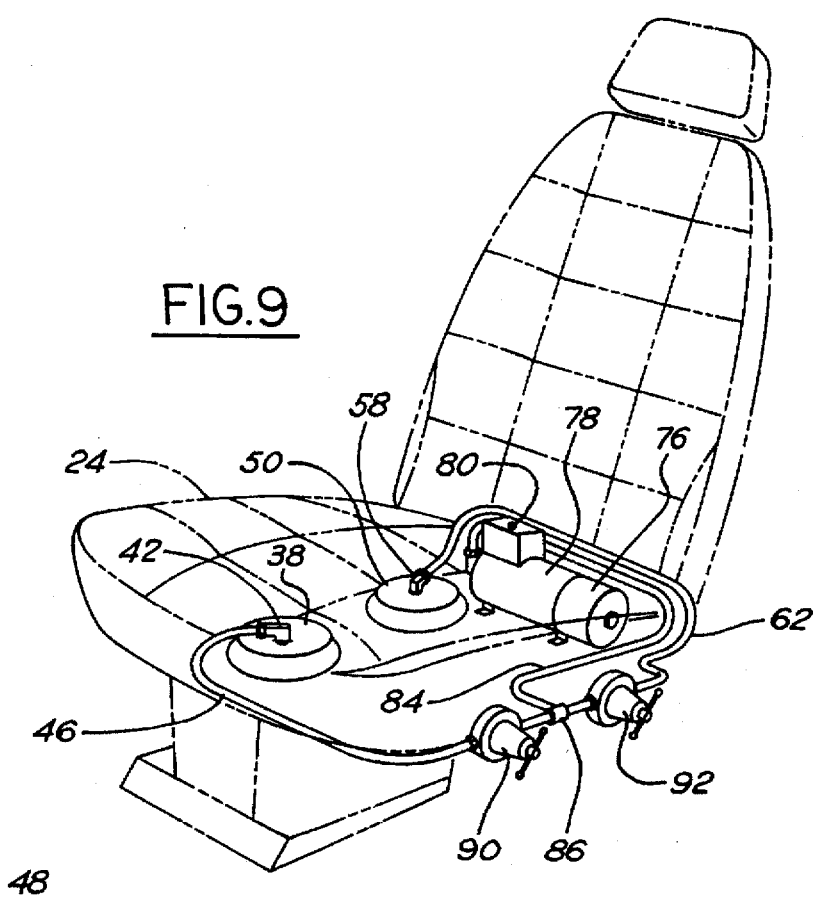
FIG. 9 is a schematic layout of the control system for the invention.

As shown in FIG. 9, the adjustable pressure regulators 90 and 92 are located at a side of the seat 24, readily accessible to the occupant of the seat. The motor 76 and compressor 78 are mounted just behind the seat 24.

In operation, before moving the vehicle, the air pressures in the respective front and rear air bag springs 38 and 50 may be initially either infinitely varied or varied in predetermined increments via manual actuation of the respective pressure regulators 90 and 92, so as to be comfortable for a particular driver, depending upon his or her respective weight and/or size. The heavier the driver, the higher the pressure required in the air bag springs 38 and 50.

During travel, the rear air bag spring 50 absorbs the vertical-downward motion of the seat carrier 26 and the wall 57 induced by road shocks. The front air bag spring 38 absorbs the vertical-upward motion of the carrier flanges 28 via the links 32 and the bottom tray 41 induced by road shocks.

Figure 2:
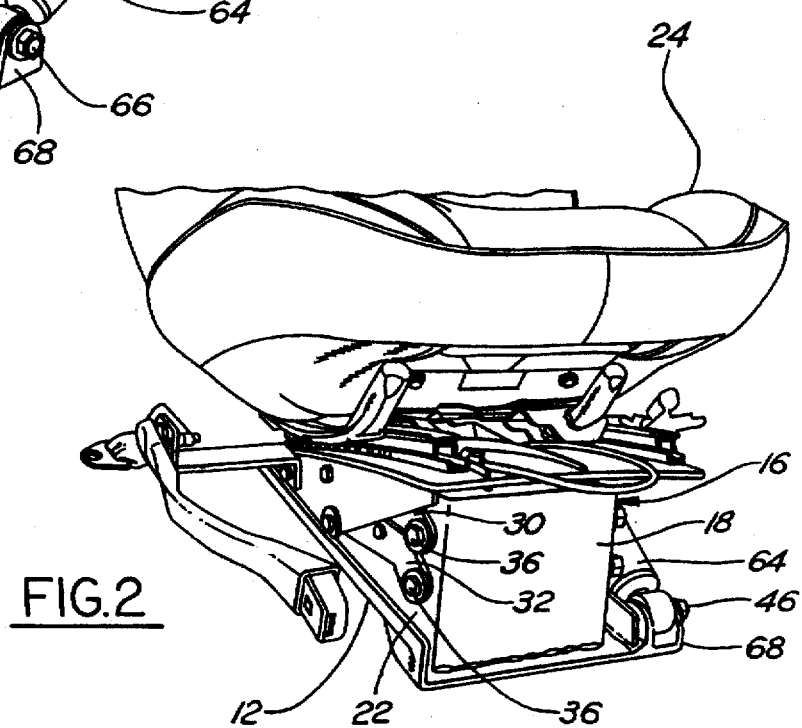
FIG. 2 is a fragmentary perspective view of the vehicle seat form a different direction.

A shock absorber 64 (FIG. 2) is connected at the opposite ends thereof to respective pivot pins 66 and 67 mounted on a bracket 68 secured to the base 12 and on a bracket 69 to one of the side walls 22, respectively. The shock absorber 64 serves to dampen the springing action of the air bag springs 38 and 50 that results upon the vehicle encountering the road shocks.

INDUSTRIAL APPLICABILITY

It should be apparent that this invention provides a mechanism for eliminating harsh "bottoming" and "topping", motion sickness, head bumping, and the pulling of the driver's feet from the pedals.

It should be further apparent that the invention provides a mechanism that mounts under a conventional bucket seat which isolates the driver from road shocks by providing adjustable vertical motion damping in both upward and downward directions.

It should be still further apparent that the seat and frame will rotate about the parallel link pivots as road shocks are induced into the vehicle, and this motion is damped by the two air bag springs and the shock absorber, reducing the amount of energy and motion transmitted to the driver and increasing his comfort level by reducing the overall oscillating amplitudes.

It should also be apparent that the two air bag springs are positioned at the front and rear beneath the seat so as accommodate the proper height of the seat in a vehicle. If height of the seat were not a factor, the two air bag springs could be vertically aligned.

While but one embodiment of the invention has been shown and described, other modifications are possible within the scope of the following claims.

What is claimed is:

1. A seat mounting mechanism for a vehicle including a seat carrier, said mechanism comprising a base, a tower secured to the base, a pair of oppositely disposed flanges extending downwardly from a mid-section of the seat carrier, oppositely disposed pairs of links, each link pivotally connected at its respective ends between respective flanges and the tower, a first air bag spring secured at one end thereof to said tower and operatively connected at the other end thereof to at least one of said oppositely disposed links, a second air bag spring secured between said base and said seat carrier, and external control means for controlling initial pressures in each of said air bag springs.

2. The seat mounting mechanism described in claim 1, wherein said tower includes a front wall, a top wall, and oppositely disposed side walls, and said links are pivotally connected to respective side walls.

3. The seat mounting mechanism described in claim 2, wherein the links of each of said pairs of links are in a parallel relationship.

4. The seat mounting mechanism described in claim 1, wherein said base is secured to the vehicle floor pan.

5. The seat mounting mechanism described in claim 1, wherein the pressures in said first and second air bag springs are individually controlled by said control means.

6. The seat mounting mechanism described in claim 1, wherein said first air bag spring is forward of said second air bag spring.

7. The seat mounting mechanism described in claim 1, wherein said second air bag spring abuts against said seat carrier.

8. The seat mounting mechanism described in claim 1, wherein said first air bag spring absorbs vertical-upward motion of said seat carrier induced by road shocks, and said second air bag spring absorbs vertical-downward motion of said seat carrier induced by road shocks.

9. The seat mounting mechanism described in claim 1, and a shock absorber pivotally mounted between said base and said seat carrier at one side thereof for dampening the springing action of said first and second air bag springs.

10. The seat mounting mechanism described in claim 1, wherein the external control means includes an electric motor and air compressor combination, with electrical wiring extending to the motor from the vehicle battery, dual air lines operatively connected between the compressor and the respective air bag springs, and adjustable pressure regulators mounted in the respective dual air lines.

11. A seat mounting mechanism for a vehicle including a seat carrier and a floor pan, said mechanism comprising a base secured to the floor pan, a tower secured to the base, oppositely disposed pairs of links, each link pivotally connected at its respective ends between the seat carrier and the tower, a first air bag spring secured at one end thereof to said tower and at the other end thereof operatively connected to said oppositely disposed links, a second air bag spring confined between said base and said seat carrier, and control means operatively connected to both air bag springs for controlling respective pressures in each of said air bag springs.

12. The seat mounting mechanism described in claim 11, wherein said oppositely disposed pairs of links comprise two sets of parallel links.

13. The seat mounting mechanism described in claim 11, wherein said second air bag spring is mounted on said base and secured at the upper end thereof to said seat carrier.

* * * * *